Patented Sept. 3, 1929.

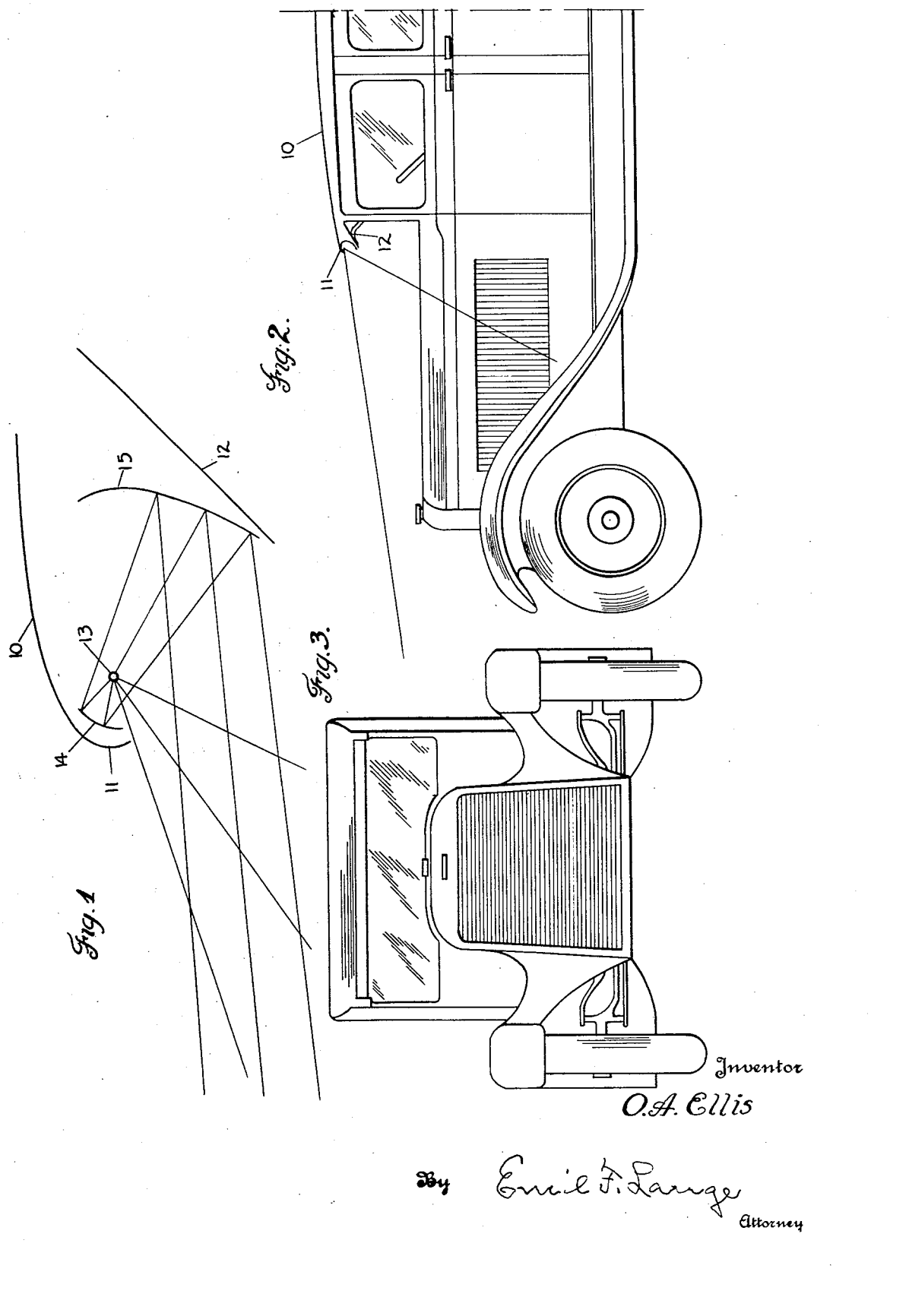

1,726,697

UNITED STATES PATENT OFFICE.

OSCAR A. ELLIS, OF LINCOLN, NEBRASKA.

MINIMUM-GLARE HEADLIGHT.

Application filed October 8, 1928. Serial No. 311,014.

My invention relates to headlights for automobiles.

The primary object of my invention is the provision of a headlight which will thoroughly illuminate the road without sending direct rays of light into the eyes of the driver of an approaching car.

It is also my object to provide a headlight which will throw rays of light to a considerable distance ahead of the car and to also illuminate the front portion of the automobile and to illuminate the road to a considerable distance on each side of the front portion of the automobile.

Another of my objects is the provision of a plurality of lights positioned at the level of the top of the automobile and obscured from the driver's line of vision by the visor and obscured from the line of vision of the driver of an approaching car by the down-curved forward portion of the top of the automobile, the light rays being dispersed by means of a plurality of reflecting mirrors.

Having in view these objects and others which will be pointed out in the following description, I will now refer to the drawings, in which Figure 1 is a diagrammatic representation of the mirror and light arrangement of my device in their relation to both the visor and the top of the automobile.

Figure 2 is a view in side elevation of the forward portion of an automobile showing my headlight secured thereto.

Figure 3 is a view in front elevation of the same automobile.

Referring particularly to Figure 1, the numeral 10 indicates the top of the automobile with its down-turned forward end 11. The windshield visor is shown at 12. In carrying out my invention I position a plurality of electric light bulbs 13 transversely across the windshield forward of the visor 12 and behind the down-curved portion 11 of the top 10. These bulbs should be placed well forward as shown in Figure 1 so that the down-turned part 11 of the top of the automobile will cut off a portion of the light rays so that the driver of an approaching car will not be bothered by blinding light rays unless he lifts his eyes to a considerable distance above the road.

The numeral 14 designates a mirror arrangement forward of the bulbs 13 for receiving some of the light rays from the bulbs to reflect them on the mirror 15 which is positioned immediately forward of the visor 12. The mirror 15 is spiral in cross section but straight in longitudinal section and it is so curved and positioned that the light rays which strike it are deflected downwardly and forwardly on to the front portion of the automobile and on the road to the desired distance ahead of the automobile. The mirror arrangement at 14 may be of either of two kinds but either form will be parabolic in cross section. In longitudinal section the mirror 14 may be straight or it may consist of a plurality of mirrors equal in number to the number of bulbs 13, each mirror having a reflecting surface in the form of a paraboloid. If the bulbs 13 are placed at the focus of the parabolic reflecting surface 14, the light rays reflected from that reflecting surface will be parallel until they reach the reflecting surface 15. It is not necessary, however, that the bulbs 13 be placed at the focus of the parabolic reflecting surface since it is necessary that the light rays from the reflector 15 be dispersed and such dispersal may be obtained by an initial dispersal from the reflector 14 which is then magnified by the reflector 15. If it is desired to control this dispersal, a simple adjustment may be provided for either the bulbs 13 or the reflecting surface 14 so that the bulbs 13 will be either at the focus of the reflecting surface 14 or at a varying distance away from it.

The light rays illuminating the road come not only from the reflecting surface 15 but also directly from the bulbs 13. Due to the irregularities in the surface of commercial glass there will be sufficient dispersal of light rays at the opposite ends of the reflector 15 to throw the light rays to a considerable distance on each side of the road. The driver's eyes are shielded by the visor 12 from the direct rays of the bulbs 13 and from the reflected rays of the mirrors 14 and 15. The driver of an approaching car has his eyes on the road ahead so that the illumination of the road is of benefit not only to the driver of the car equipped with my device but also to the driver of an approaching car. There is no occasion for the driver of an approaching car to be blinded unless his eyes leave the road to a considerable level above the road. My device not only illuminates the road in front and on both sides but it also illuminates the radiator and cover. This is particularly useful in night driving when the radiator is equipped with a motometer as it gives the driver of the car a knowledge of his engine heat which he cannot obtain by means of the ordinary forms of headlights.

Having thus described my invention in such full, clear, and exact terms that its construction and operation will be readily understood by others skilled in the art to which it pertains, what I claim as new and desire to secure by Letters Patent of the United States is:

1. In combination with an automobile having a visor, a source of light positioned forward of the visor and underneath the downturned forward end portion of the top of the automobile, and a pair of mirrors positioned on opposite sides of said source of light, one of said mirrors being adapted to reflect the rays of light from said source of light on to the other of said mirrors and the other of said mirrors being adapted to receive the rays of light both from the first said mirror and from said source of light and to deflect the rays of light in a forward and downward direction.

2. In combination with an automobile having a visor, a source of light positioned forward of the visor and underneath the downturned forward end portion of the top of the automobile, and a pair of mirrors positioned on opposite sides of said source of light, one of said mirrors being parabolic in form and being adapted to reflect the rays of light from said source of light on to the other of said mirrors, the other of said mirrors being spiral mirrors, the other of said mirrors being spiral in form and being adapted to receive the rays both from said source and from said parabolic mirror and to deflect the rays of light in a forward and downward direction.

3. In combination with an automobile, a plurality of light bulbs positioned transversely across the automobile windshield and in spaced relation with the upper edge thereof, a mirror having a spiral cross sectional form, said mirror being positioned between said light bulbs and the automobile windshield, each of said light bulbs having a parabolic mirror positioned forwardly thereof for reflecting the light rays from said light bulbs on to said spiral mirror, said spiral mirror being adapted to receive the light rays both from said light bulbs and from said parabolic mirrors and to deflect the light rays in a forward and downward direction.

In testimony whereof I affix my signature.

OSCAR A. ELLIS.